Feb. 22, 1944.    A. H. MOSHER ET AL    2,342,480
BATTERY FILLING DEVICE
Filed April 12, 1941
Fig. 1.
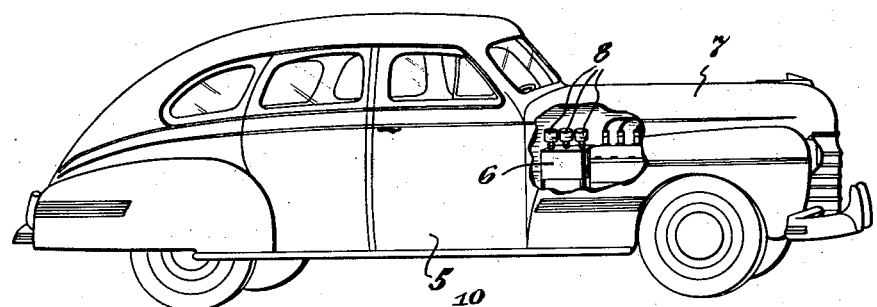
Fig. 6.
Fig. 3.
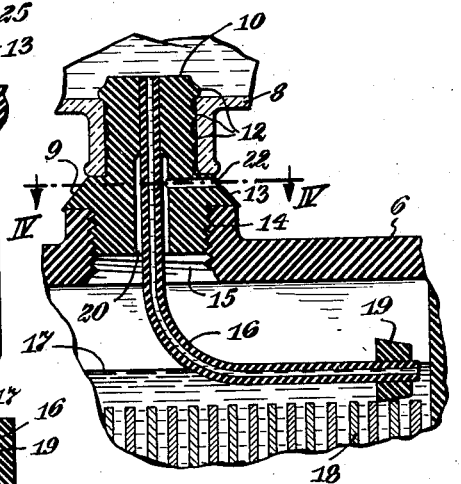
Fig. 2.
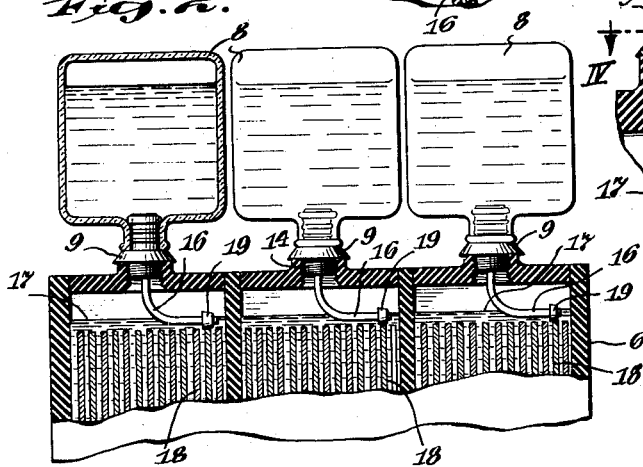
Fig. 5.
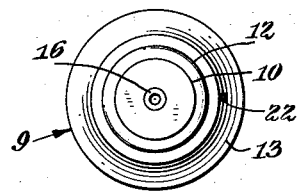
Fig. 4.
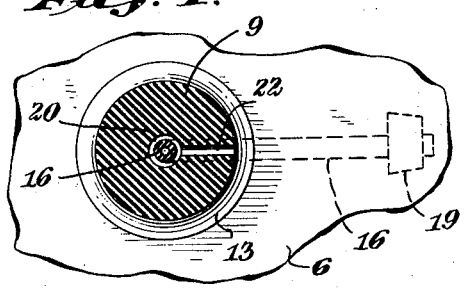
INVENTOR
ASA H. MOSHER
WILLIAM G. YOUNGHOLM
BY
ATTORNEY Patented Feb. 22, 1944

2,342,480

UNITED STATES PATENT OFFICE 2,342,480

BATTERY FILLING DEVICE

Asa H. Mosher, Westfield, and William G. Youngholm, Fanwood, N. J.; said Mosher assignor to said Youngholm Application April 12, 1941, Serial No. 388,196

6 Claims. (Cl. 136—162)

The present invention relates to a liquid level control apparatus for maintaining a constant level in a container and relates more particularly to an apparatus for maintaining the level of the electrolyte in a storage battery thus constituting a modification of the structure shown in U. S. Patent No. 2,209,788 issued July 30, 1940, to A. H. Mosher, co-inventor of the present invention.

As shown and described in the said patent an apparatus is provided to operate in response to variations in the level of the electrolyte whereby the electrolyte in the container or battery is automatically replenished when the level thereof falls below a predetermined point.

Although the apparatus as described and claimed in the above patent operates satisfactorily for certain requirements, the present invention provides a modified or simplified form of the invention involving new and novel features to provide enough containers for each cell of the battery so constructed and arranged as to be conveniently and readily adaptable to serve as reservoirs for replenishing the electrolyte liquid in the respective battery cells.

An object of the present invention is, therefore, to provide an electrolyte control apparatus which can be easily installed or removed from the storage battery.

Another object of the present invention is to provide an electrolyte level control apparatus including a supply tank or container so constructed and supported as to avoid injury when subjected to vibration, jars or sudden shock by means for providing the free movement of a liquid container relative to its point of attachment to the battery.

Another object of the invention is the provision of an electrolyte level control container which may be directly attached to a storage battery cell and having an outlet or liquid feed conduit so constructed and arranged as to maintain the outlet orifice thereof in a predetermined position irrespective of the free movement of the container under vibration or shocks.

Still further objects of the present invention will become obvious to those skilled in the art by reference to the accompanying drawing wherein:

Fig. 1 is a perspective view of a modern design automobile equipped with an electrolyte level control apparatus in accordance with the present invention;

Fig. 2 is an elevational view partly in cross-section showing the electrolyte level control apparatus of the present invention attached directly to the cells of a storage battery as shown in its application to the automobile of Fig. 1;

Fig. 3 is a partial sectional view on an enlarged scale, of one of the connectors for supporting the liquid reservoir and attaching the same to one of the storage battery cells;

Fig. 4 is a sectional view taken on the line IV—IV of Fig. 3;

Fig. 5 is a top plan view of the connector for the reservoir and battery cell as shown more in detail in Fig. 3; and Fig. 6 is a partial sectional view on a slightly enlarged scale and showing a modified form which the connector of Fig. 3 may take.

Referring now to the drawing in detail an automobile 5 is shown in Fig. 1 wherein the storage battery 6 is supported beneath the hood 7 to facilitate servicing of the battery as is now customary. The improved electrolyte level control apparatus of the present invention is shown in Fig. 2 wherein each cell of the storage battery 6 is provided with a liquid reservoir 8 for containing a liquid and since, as shown, the apparatus is identical for each cell a description of the details of construction of one unit is believed to suffice for a complete understanding of the present invention.

By referring now more particularly to Figs. 2 and 3 of the drawing it will be noted that a practical embodiment of the invention may comprise a reservoir or container 8 in the form of an inverted bottle which is supported above a container by means of a connector shown generally at 9. This connector constitutes a combined stopper and battery cell cap and is constructed of a firm, but resilient material such as rubber or the like and provides a direct connection between the container 8 and a cell of the battery 6.

The connector 9, although sufficiently rigid to serve as a battery cap and a supporting container stopper is still flexible enough to permit free relative movement of the container thus avoiding strains or rupture of the container which might be otherwise caused by built up or accumulated stresses due to the resisting leverage forces under the tendency of the container to resist inertia upon the starting or stopping of a vehicle.

Furthermore the stopper supporting element permits a limited free movement of the container so as to cushion shocks or vibration and compensate for the unbalanced weight by reason of the movement of the liquid mass in the container.

As shown more in detail in Fig. 3 the connector 9 is provided with a portion 10 of slightly reduced diameter and a projection 12 which serves as the above mentioned extended support and stopper. This support may be provided with coarse threads or annular ribs to retain the connector 9 in the mouth of the bottle or container.

Extending from the portion 10 is an annular shoulder 13 having a slightly beveled periphery. The normal lower end of the reservoir or container 8 is seated on one side of the shoulder 13 and extending from the opposite side of the shoulder and integral therewith is a projection 14 which is secured in the storage battery filler opening 15 by suitable means to thus form a battery cap. To complete the connection the connector 9 is first screwed into the neck of the container to form a friction tight stopper, as before mentioned, and due to this tight fit the reservoir 8 may be merely inverted and the reservoir together with the connector rotated to screw the threaded end 14 into the battery opening 15.

For the purpose of conducting liquid from the reservoir to the battery cells, a small flexible conduit 16 of soft rubber or the like passes through the connector 9 with its upper end terminating at the free or normally upper end of the connector 10. This tube or conduit 16 is inserted into the battery opening 15 preceding the threaded engagement between the projection 14 and the threaded opening. The flexibility of the conduit permits its movement during the rotation of the projection 14 for threaded engagement with the opening 15. The conduit is of sufficient length, as shown in Fig. 3, to not only depend below the connector 9 but to extend an appreciable distance parallel to the surface of the electrolyte 17 covering the plates 18 of the battery 6. The free end or outlet orifice of the conduit 16 is provided with a member 19 which may be of any suitable form such as a square or disc of definite size which determines the substantially constant level of the electrolyte, as hereinafter more fully explained. Each connector 9 is also provided with a vent for the battery cells which, as shown, comprises a longitudinal passage 20 surrounding the tube or conduit 16 for a part of its length and communicating with a radially extending passageway 22 opening to the atmosphere at the tapered periphery of the annular shoulder 13.

In the present construction as in that shown and described in the above mentioned patent, the internal cross-sectional area of each conduit 16 is so small that liquid only or air only can pass through it. Accordingly bubbles of air cannot pass through liquid in the conduits 16 and vibration and shocks have no influence on the flow of liquid from a reservoir to its corresponding cell. Moreover, the length of each conduit 16 is such that the total volume of the passage therein is less than the volume of liquid displaced from the corresponding reservoir at any one time incident to subjecting the liquid content of the reservoir to positive pressure although the total volume naturally varies with the length of the conduits.

Owing to the position of the reservoirs 8 as shown in Fig. 1, they are naturally subjected to heat from the engine of the automobile, although any source of heat, such as an electric resistance heater, or the like, may be employed to effect a change in pressure within the reservoirs. Upon subjection to heat, and assuming the electrolyte within the battery 6 is below its substantially constant level, the air or fluid within the reservoirs 8 (above the level of the water) is expanded. This expansion causes an exertion of pressure on the liquid within the reservoirs forcing the liquid into the several cells of the storage battery 6 through the respective conduits 16. Since the liquid is forced directly into each battery cell the level of the electrolyte 17 is raised by the addition of the liquid so long as the pressure of the air within the reservoirs rises due to heat transfer.

When the temperature drops, for example, by discontinuance of the supply of heat, the air above the level of the liquid within the respective reservoirs contracts. Such contraction accordingly results in the creation of a partial vacuum which draws the liquid from the battery cells upwardly into the respective reservoirs through the conduits 16. This withdrawal thus continues under the action of the increasing negative pressure until the level of the electrolyte 17 reaches that of the outlet orifice of the tube 16 which level is controlled by the dimensions of the member 19. Moreover, it should be noted that the electrolyte level is maintained substantially constant (i. e. within very narrow limits controlled by size of conduits 16 and member 19) and it does not fall below the level of the outlet orifice of the conduits because if the outlet orifice of the conduits 16 were uncovered air instead of liquid would be drawn into the reservoirs so that the partial vacuum condition would be destroyed. Thus the transfer of liquid from each reservoir 8 through the respective conduits 16 to the battery cells, and vice versa, is caused entirely by the expansion and contraction of the air within the reservoir due to temperature changes, and air or fluid is introduced into the reservoirs only after its respective conduit has been freed of liquid by the suction action exerted by the partial vacuum caused by contraction of the residual air or fluid within the reservoirs upon cooling.

There are naturally occasions where automobiles may be in storage for a period of time sufficient to cause evaporation of the electrolyte to the point where its level falls below that of the outlet orifice of the conduits 16 where the ambient temperature is constant. In instances of this kind upon initial expansion of the residual air or fluid in the reservoirs due to heat transfer, liquid will be forced into the cells as above mentioned during the first half-cycle operation and on the second half-cycle only air will be drawn into the reservoirs from the cells until the battery electrolyte level is sufficiently high to cover the outlet orifices of the conduits 16 after which the apparatus continues to function in the normal manner above described.

If, on the other hand there is a sufficient fluctuation of ambient temperature even when the automobile is at rest as in storage instead of the ambient temperature remaining substantially constant, the device functions in its normal manner as above described.

Moreover, the exact level of the electrolyte of each cell is controlled by the dimensions of the member 19, and the lateral position of the flexible conduits 16, with their outlet orifices at right angles to the plane of the electrolyte in the cells, serves as a baffle to prevent gas bubbles which occur during charging of the battery from entering the conduits. Also since the conduits 16 are of restricted size and preselected length they bear a direct relationship to the volume of liquid displaced during each cycle of operation and are adequate to prevent overfilling, overflow or slopping of the liquid within the cells of the battery 6.

The modification as shown in Fig. 6 is identical in most respects to that of Fig. 3 with the exception that an annular skirt portion 25 is provided as an integral molded part of the connector. As shown, this skirt is adapted to surround the outer surface of the neck of the bottle or reservoir 8 and since the inner surface of this annular skirt portion 25 is provided with corrugations 26 a friction tight connection is formed exteriorly as well as interiorly of the opening in the reservoir. This accordingly increases the strength of the connector 9 without sacrifice of its resiliency and ability to resist vibration and shock and at the same time reduces swaying of the bottles 8.

It thus becomes obvious to those skilled in the art that an electrolyte level control apparatus, particularly for storage batteries, is herein shown which is exceptionally simple and economical to manufacture yet highly efficient in operation. Due to its simplicity it can be readily installed by the average motorist on an automobile storage battery.

Moreover, since the apparatus is of resilient yet rugged construction it resists the strain of vibration and shocks by eliminating point concentration of strain which prevents fracture and breakage thus making for a long useful life of the apparatus in its entirety.

Although one specific embodiment of the present invention has been shown and described it is to be understood that other modifications thereof may be made without departing from the spirit and scope of the appended claims.

What is claimed is:

1. An electrolyte level control apparatus for use with an electric storage battery cell comprising a connector unit of resilient material engageable with the battery cell, a reservoir supported by said connector unit and containing liquid to be delivered to said battery cell, and a conduit passing through said connector unit and into said battery cell said conduit having at the free end thereof an opening disposed with its axis parallel to the surface of the liquid in the battery cell, said conduit having an internal diameter so small that liquid only or air only can pass through it and the total volume of said conduit being such that liquid is passed through said conduit in an amount less than the difference in air volume produced in said reservoir in response to temperature differentials caused by periodic heating and cooling of said reservoir.

2. An electrolyte level control apparatus for use with an electric storage battery cell comprising a connector unit of resilient material engageable with the battery cell, a reservoir supported by said connector unit and containing liquid to be delivered to said battery cell, and a conduit passing through said connector unit and into said battery cell parallel to the level of the electrolyte therein to form a baffle to prevent gas bubbles passing from said cell to said reservoir during charging of said battery and said conduit having an internal diameter so small that liquid only or gas only can pass through it and the total volume of said conduit being such that liquid is passed through said conduit in an amount less than the difference in air volume produced in said reservoir in response to temperature differentials caused by periodic heating and cooling of said reservoir.

3. An electrolyte level control apparatus for use with an electric storage battery cell having plates comprising a connector unit of resilient material engageable with the battery cell, a reservoir supported by said connector unit and containing liquid to be delivered to said battery cell, a conduit passing through said connector unit and into said battery cell and having a portion thereof disposed in substantially parallel relation to the surface of the liquid in the battery cell said conduit having an internal diameter so small that liquid only or air only can pass through it and the total volume of said conduit being such that liquid is passed through said conduit in an amount less than the difference in air volume produced in said reservoir in response to temperature differentials caused by periodic heating and cooling of said reservoir, and means resting on said plates for holding the outlet orifice of said conduit at right angles to the surface of the electrolyte in said battery cell and at a preselected height above the battery plates.

4. A control member for an electrolyte level control apparatus for use with an electric storage battery cell comprising a connector provided with means engageable with the filler cap of the battery cell, a shoulder on said connector to form a liquid seal with said battery, an upwardly extending portion on said connector engageable with a reservoir for holding liquid to be supplied to said battery cell and forming a combination stopper and support for said reservoir, and a conduit extending through said connector and having a portion of its length disposed parallel to the surface of liquid in the battery cell, said conduit having an internal diameter so small that liquid only or air only can pass through it and the total volume of said conduit being such that liquid is passed through said conduit in an amount less than the difference in air volume produced in said reservoir in response to temperature differentials caused by periodic heating and cooling of said reservoir.

5. A control member for an electrolyte level control apparatus for use with an electric storage battery cell comprising a connector of resilient material to prevent breakage thereof due to shocks and vibration and provided with threads engageable with the filler cap of the battery cell, a shoulder on said connector for forming a liquid seal with said battery, an upwardly extending stopper portion on said connector engageable with a reservoir for holding liquid to be supplied to said battery cell and forming a support for said reservoir, and a flexible conduit extending through said connector and of sufficient length as to be adjustable to dispose a portion of its length substantially parallel to the liquid in the battery cell, said conduit having an internal diameter so small that liquid only or air only can pass through it and the total volume of said conduit being such that liquid is passed through said conduit in an amount less than the difference in air volume produced in said reservoir in response to temperature differentials caused by periodic heating and cooling of said reservoir.

6. A control member for an electrolyte level control apparatus for use with an electric storage battery cell having plates comprising a connector of resilient material provided with means engageable with the filler cap of the battery cell, a shoulder on said connector for forming a liquid seal with said battery, an upwardly extending stopper portion on said connector engageable with a reservoir for holding liquid to be supplied to said battery cell and forming a support for said reservoir, a conduit extending through said connector, means resting on said plates for holding the axis of the opening at the free end of said conduit substantially parallel to the surface of the liquid in the battery, said conduit having an internal diameter so small that liquid only or air only can pass through it and the total volume of said conduit being such that liquid is passed through said conduit in an amount less than the difference in air volume produced in said reservoir in response to temperature differentials caused by periodic heating and cooling of said reservoir, and a member secured to the free end of said conduit to position the outlet orifice thereof at right angles to the plane of the electrolyte within said battery cell and at a preselected height above the battery plates.

ASA H. MOSHER.
WILLIAM G. YOUNGHOLM.